United States Patent [19]

Couturier

[11] Patent Number: 5,151,802
[45] Date of Patent: Sep. 29, 1992

[54] DEVICE FOR FORMING IMAGES ON A LARGE SURFACE AND SIMULATOR EQUIPPED WITH SUCH A DEVICE

[75] Inventor: Alain Couturier, Les Essarts Le Roi, France

[73] Assignee: Thomson-CSF, Puteaux, France

[21] Appl. No.: 707,564

[22] Filed: May 30, 1991

[30] Foreign Application Priority Data

Jun. 19, 1990 [FR] France ................... 90 07640

[51] Int. Cl.⁵ .................................. G02F 1/13
[52] U.S. Cl. ...................... 359/51; 359/36; 359/61; 359/84
[58] Field of Search ............. 359/51, 53, 84, 61, 359/36, 62

[56] References Cited

U.S. PATENT DOCUMENTS

| | | | |
|---|---|---|---|
| 4,693,560 | 9/1987 | Wiley | 359/52 |
| 4,732,456 | 3/1988 | Fergason et al. | 359/51 |
| 4,806,922 | 2/1989 | McLaughlin et al. | 359/52 |

FOREIGN PATENT DOCUMENTS

| | | |
|---|---|---|
| 0275061 | 7/1988 | European Pat. Off. . |
| 0324147 | 7/1989 | European Pat. Off. . |
| 8800715 | 1/1988 | PCT Int'l Appl. . |

OTHER PUBLICATIONS

Shimazaki et al., New Technology, "Sophisticated Visual Display Now Possible with Flight Simulator", Journal of Elec. Engineering, vol. 18, No. 180, 1981.

Primary Examiner—Stanley D. Miller
Assistant Examiner—Huy K. Mai
Attorney, Agent, or Firm—Oblon, Spivak, McClelland, Maier & Neustadt

[57] ABSTRACT

A simulator comprises a dome on which are formed synthesized large-field images, the image-forming surface of the dome being "active", i.e., it is not used as a projection screen, but the images are formed directly by "cells". As a result of this arrangement, successive portions of the spherical surface, which are dark in the absence of excitation, make it possible to increase the contrast of the images obtained. According to one embodiment, these cells comprise encapsulated liquid crystals.

10 Claims, 4 Drawing Sheets

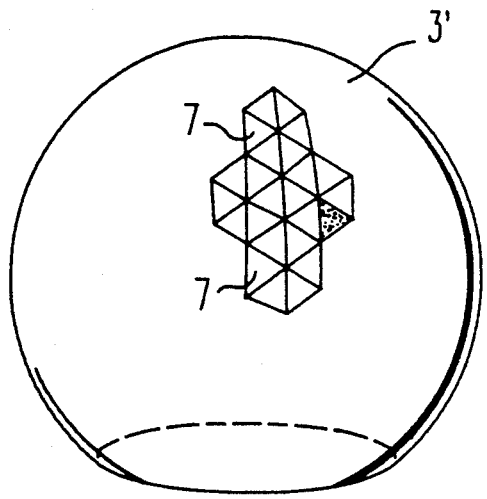
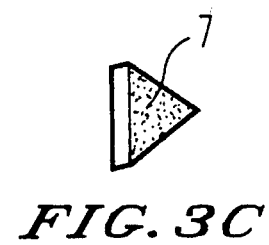
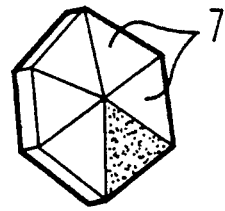
*FIG. 3A*
*FIG. 3C*
*FIG. 3B*
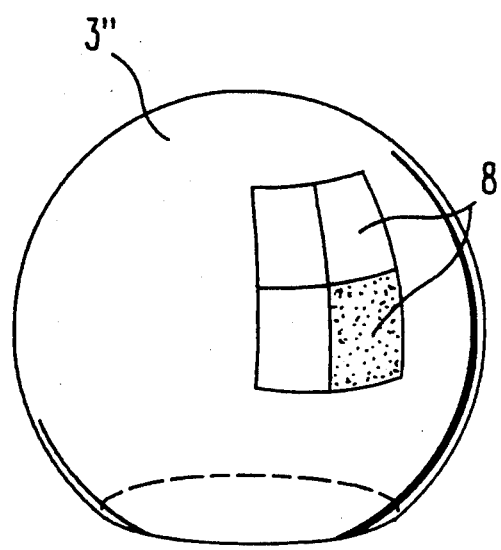
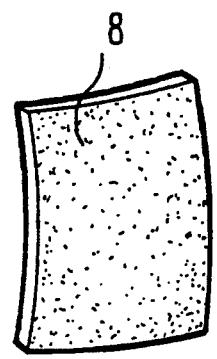
*FIG. 4A*
*FIG. 4B*

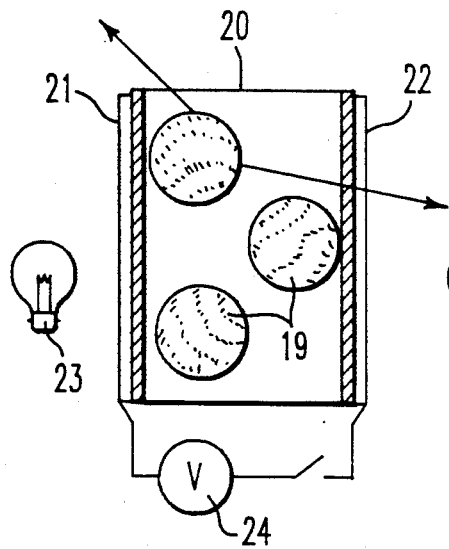
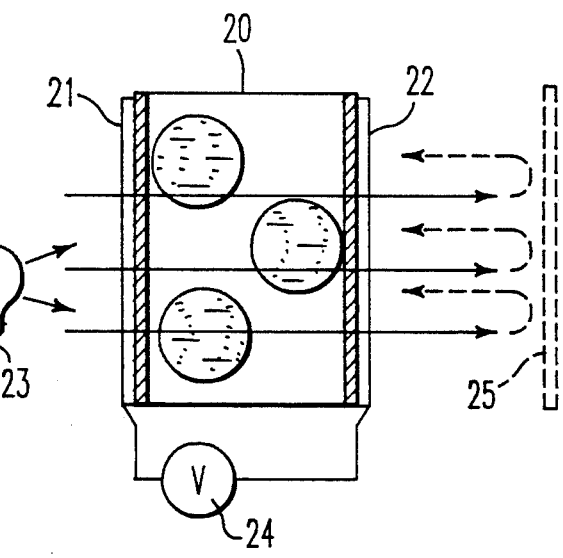
FIG. 7A  FIG. 7B
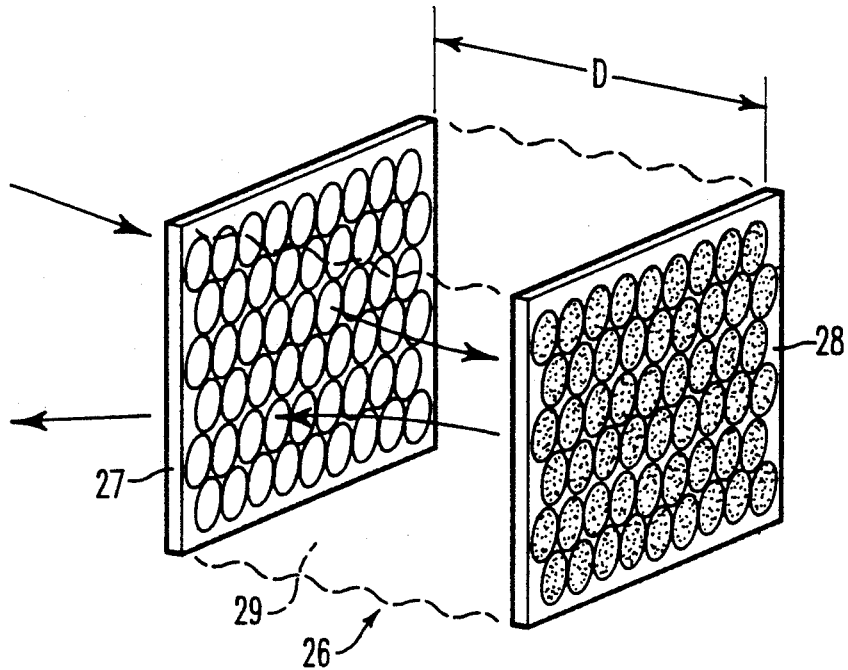
FIG. 8

DEVICE FOR FORMING IMAGES ON A LARGE SURFACE AND SIMULATOR EQUIPPED WITH SUCH A DEVICE

BACKGROUND OF THE INVENTION

1. Field of the Invention

The present invention generally relates to a device for forming images on a large surface, and more particularly to such a device for use in displaying images on a spherical surface.

2. Background Discussion

Current simulators, in particular aircraft simulators, comprise a sphere, on which are projected synthesized and/or prerecorded images. Such simulators have, approximately at the center thereof, a booth in which the users sit, the entire unit being generally mobile in several degrees of freedom. The images are projected by several projection devices. These projection devices are generally of two types: 1) those related to displaying the landscape (sky and land), and 2) those displaying other aircraft, which are to have a better resolution than that provided for the landscape display.

These projecting devices are often bulky and, when they are mobile, can interfere with one another and have a high inertia which prevents them from reacting quickly and accurately, for example, to rapid movements of the user's head. Further, large angle projection devices (such as the so called "fish eye") exhibit large geometric deformations and optical aberrations. Additionally, the projection surface of the sphere, which is typically white, is by nature similar to an integrating sphere, i.e., when it is partially lit by a projector, even on a small part of its surface, no point of its surface not lit by this projector can be black. As a result, this feature of the spherical projection surface clearly reduces the contrast and therefore the perception of the resolution of the projected images.

SUMMARY OF THE INVENTION

One object of the present invention is to provide a device for forming images on a large surface, in particular for a simulator, which makes it possible to display images on a spherical surface by exhibiting the smallest possible occupation inside the space contained by this surface, the fewest possible geometric distortions and aberrations and the shortest possible response time, and the best contrast possible, while not being more costly than comparable current devices.

The device for forming images on a large surface according to preferred embodiments of the invention comprises an "active screen" whose display surface is formed at least partly by juxtaposed cells each constituting the image-forming surface of a device for producing images, the cells being excited individually, those not excited being dark.

One advantageous feature of preferred embodiments of the present invention is that the addressing of the different image elements or "pixels" of each of the cells is purely electronic.

According to an advantageous embodiment, each cell comprises encapsulated liquid crystals.

According to another embodiment, each cell constitutes the end of an optical fiber connected at its other end to a device for image element production.

According to yet another embodiment, the device for producing images is slaved to movements of the user's head and electronically controls the increase of the resolution in the direction of sight of the user.

BRIEF DESCRIPTION OF THE DRAWINGS

The present invention will be better understood from reading the description of several embodiments, given by way of nonlimiting examples, illustrated by the accompanying drawing, in which:

FIGS. 3A–C and 4A–B are diagrammatic views of respective configurations of cells according to preferred embodiments of the present invention;

FIGS. 6 to 8 are simplified diagrams illustrating details for construction of two embodiments of cells according to the invention.

DETAILED DESCRIPTION OF THE PREFERRED EMBODIMENTS

The invention is described below with reference to a simulator, in particular, an aircraft simulator, utilizing a spherical dome for the display of images. However, the present invention can be used for other types of simulators (simulators for ships, control stations of factories, etc . . . ), and in simulators whose display surfaces or active screens are not spherical (for example, with a single plane panel or with several plane panels forming polyhedrons or the like).

Figure 1:
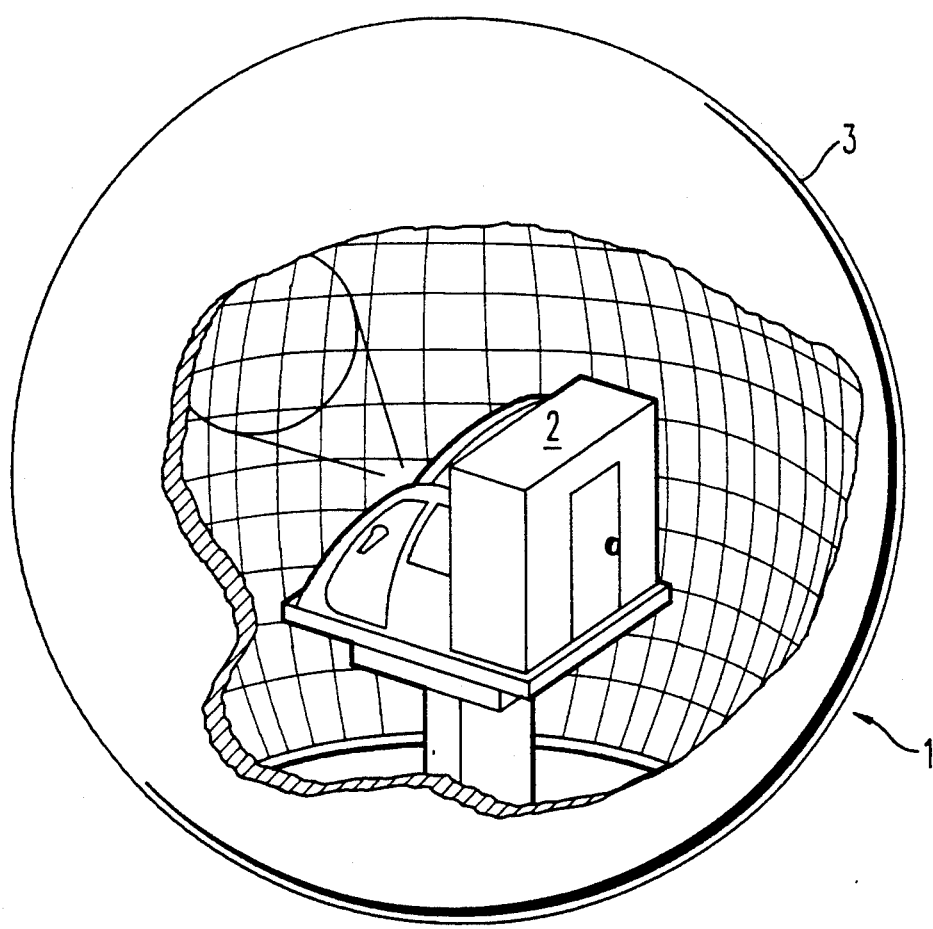
FIG. 1 is an external view of a simulator according to one embodiment of the present invention which includes an active display sphere, with a cut away portion showing a part of the inside of the sphere.

The simulator generally illustrated at 1 in FIG. 1 comprises a control booth 2 placed, for example, approximately at the center of an approximately spherical dome 3. Booth 2 reproduces a genuine aircraft control booth in the most realistic way possible.

The display surface of dome 3 is formed by a large number (several hundreds to several thousands) of display cells Vi. The cells Vi preferably have a simple geometric shape, for example, triangular, rectangular, or the like. The dimensions and the number of the cells Vi are a function of the resolution desired to be obtained.

The cells Vi can all be, for example, of the same dimensions, or alternatively, those located in the normal display field of the user, i.e., that which he sees by moving his head very slightly, can be smaller, while the others, that he is able to see less frequently, can be larger. The dimensions of the cells Vi are, therefore, a function of the technology used to produce them, and the number of pixels comprising each cell Vi depends in particular on the resolution desired.

As envisioned by preferred embodiments of the present invention, each cell Vi is a functional unit comprising a large number of pixels (several hundreds to several thousands, for example) forming an easily addressable block. The size of this addressable block of pixels is therefore also a function of the addressing arrangements or mechanisms which are available and of the way in which the displayed image is produced.

In the embodiment described below wherein the use of encapsulated liquid crystal sheets, or the use of micromonitors with liquid crystals, are made, each of which generally have a matrix configuration, existing liquid crystal modules, as well as existing control logic circuits, suitable for these modules, are preferably used. Of course, if modules with high resolution are used and there is no need for dome 3 to be provided with such a high resolution, only one part of the pixels of each cell Vi (a column and/or a line on several) can be addressed or, at each time, several columns and/or adjacent lines can be connected together, which permits the calculating device of the device for image synthesis (not shown) controlling these cells to be less costly.

Figure 2:
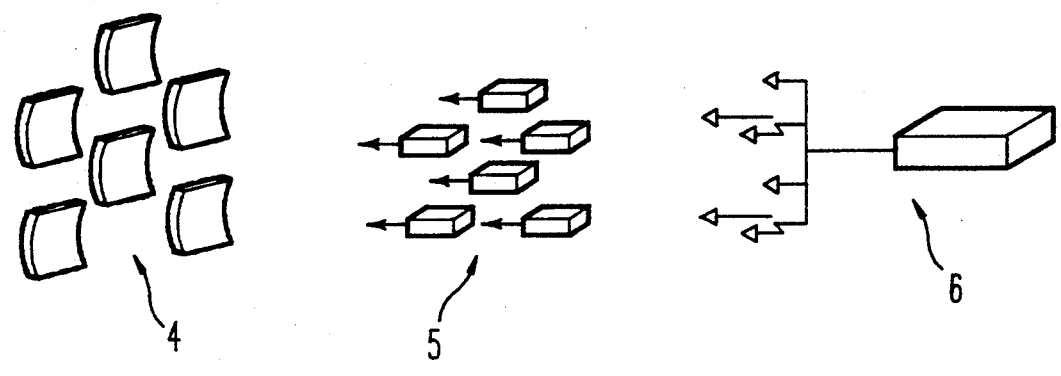
FIG. 2 is a diagrammatic representation of main components of the active sphere of FIG. 1.

In FIG. 2, the essential elements of the device for forming images with active cells of the invention are represented. These elements are: active cells 4, whose embodiments are described below, control devices 5 for the control of the individual active cells 4, and video distributors or predistributors 6.

Control devices 5, typically having a number which, as a rule, is equal to the number of individual active cells, are controllers for the cells 4 and are provided with logic circuits or with processors associated with an image micromemory. The control devices 5 provide the role of interfaces between the device for forming images (projector or end of optical fiber connected to a projector) and the individual active cells 4. The control devices 5, whose technology and complexity depend on the type of individual cells 4 used, can form an integrating part of an image zone control unit placed on dome 3, or can be separated from the dome 3, each image zone having its own control unit. An image zone is generally a portion of the total spherical surface of the image formed inside dome 3 and delimited by meridional lines and parallel lines.

Predistributors 6, which are, for example, 1 to 10 in number, are each connected at the output to several control devices 5. The predistributors 6 can be electronic and/or optical.

In FIGS. 3A-C and 4A-B, two embodiments of dome 3, namely domes 3' (FIG. 3A) and 3" (FIG. 4A), are represented. Dome 3' is pseudospherical and includes active cells with triangular plane panels 7 assembled in groups of six to form patterns with a hexagonal contour. Dome 3" is virtually spherical and is formed by flexible or conformable active cells 8 having an approximately rectangular contour. Of course, these two embodiments are only two examples from a large number of embodiments which are possible within the scope of the invention.

Figure 5:
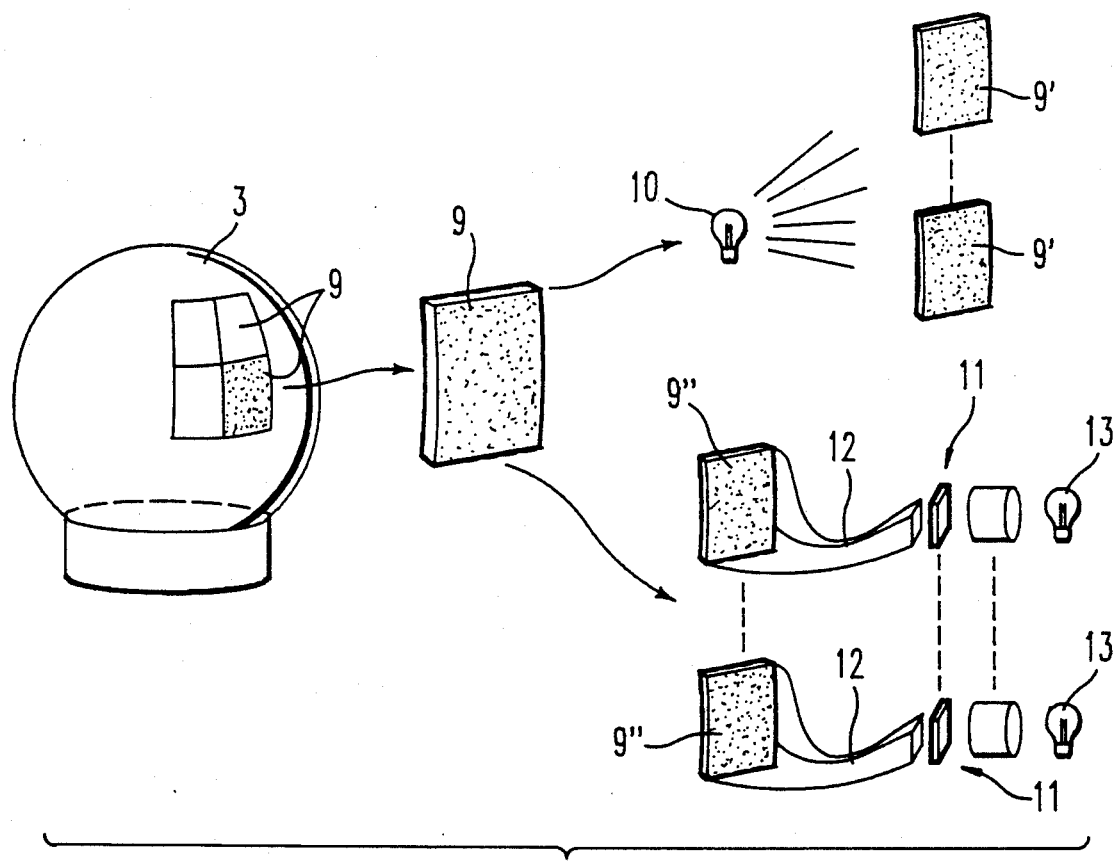
FIG. 5 is a diagram illustrating two different technologies of active cells.

The simplified diagram of FIG. 5 shows two possibilities for an embodiment of dome 3 of the invention using liquid crystals as active cells 9. If cells 9' are formed by passive liquid crystals operating by reflection, light source 10 is located inside the dome and can advantageously be slaved to the axis of observation of the user. This light source 10 is common to a large number of cells 9' and only a small number of light sources 10 are used for the entire simulator (generally from one to five).

If latter are associated with active liquid crystals, the cells 9" form a part of projectors or of micromonitors 11 connected by optical fibers 12, which can advantageously be made of plastic and therefore of low cost. Light source 13 is individually provided for each cell 9" and is placed outside dome 3. In general, these cells 9" are smaller than cells 9'.

The advantage of the embodiment employing encapsulated liquid crystals resides in particular in the homogeneity of the optical properties of the cells. Actually, the lighting energy is not created by the cells, but depends only on a global source, i.e., light source 10.

Figure 6:
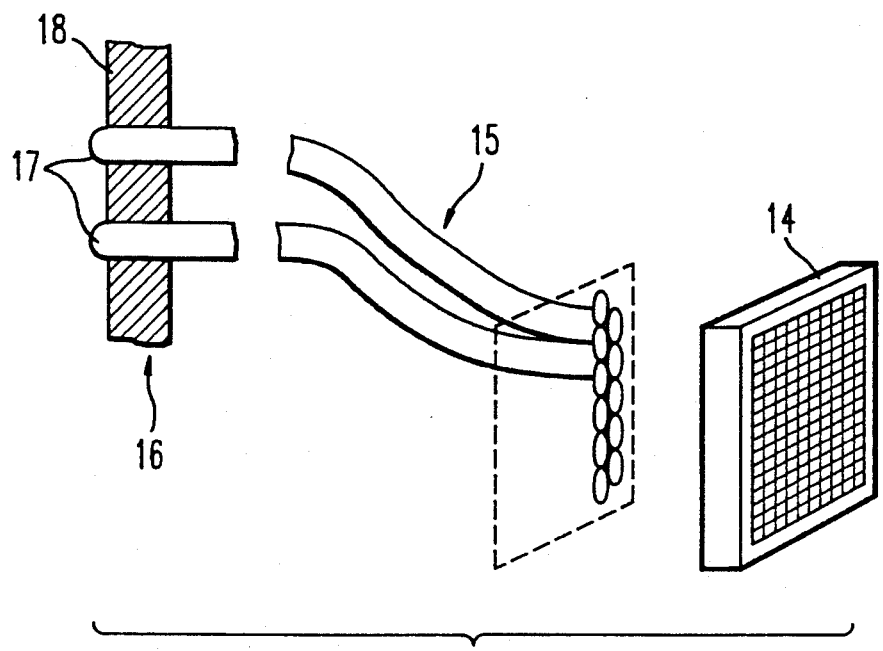

In FIG. 6, the functional diagram of the device for forming images in the embodiment using active liquid crystals has been represented. The image is produced on a screen or a micromonitor or a projector (14) with liquid crystals and is guided by a plurality of plastic optical fibers 15 acting as an anamorphoser to form the image on the surface of cell 16 which can be planar or spherical for example.

Advantageously, fibers 15 are densely packed, i.e., closely packed, on the side of projector 14 and spread at the cell 16. The ends of the optical fibers 15, at the side of cell 16, are shaped approximately as microlenses 17 to obtain a compromise between directivity and scattering, a compromise which is a function of their pitch at the level of cell 16. These ends are fixed in suitable openings of a self-supporting substrate 18, which can be produced of black composite material.

In FIGS. 7A-B, the embodiment principle of cells with flexible encapsulated passive liquid crystals is represented. Such liquid crystals are known in the art (see, for example, JAPAN DISPLAY '89, pages 572-579, the article of Z. YANIR et al.), and will only be described briefly here. Drops 19 of liquid crystal in emulsion with an opaque dye are encapsulated in a polymer sheet 20. The dye molecules form types of rods inside drops 19. On the two faces of this sheet, electrodes 21, 22 are formed of material transparent at the wavelength of light source 23 used. Electrodes 21, 22 are connected to a Voltage source 24.

In the absence of field applied to electrodes 21, 22 (in FIG. 7A), sheet 20 is virtually opaque, because the rods of the drops of liquid crystal are oriented in almost all directions. In the presence of an electric field provided by source 24, (in FIG. 7B), the dye rods are oriented in the direction of the electric field, i.e., perpendicular to the faces of the sheet, thus letting the incident light pass, and sheet 20 becomes transparent (or reflective as a whole if a reflector 25 with a coating of phosphors or of paint is added to it).

Sheet 20 is in the form of a solid plastic paste which can be applied like a paint on a suitable support (for example, a spherical support) and which has the optical properties of liquid crystals. Another advantage of this material is that microballs of liquid crystal 19 have a much shorter (about 10 times) response time than that of the standard liquid crystal equivalent.

In FIG. 8, an exploded view of a cell with encapsulated liquid crystals is represented, but of course this technology is not the only one able to be considered within the scope of the invention to produce the cells with passive liquid crystals. This cell 26 includes two flexible plastic sheets 27, 28 placed opposite one another and spaced at a distance D of about 100 microns, space 29 between these two sheets 27, 28 being filled with an emulsion of liquid crystals and opaque dye encapsulated in a polymer material. These two sheets 27, 28 then are welded to one another on their edges. The outside faces of sheets 27, 28 are covered with a layer of material which is electrically conductive and transparent at the wavelength used. Then, a grid of red, green and blue reflecting points with a diameter of about 1 to 2 mm, which can be contiguous, are painted on the outside face of one of the sheets.

Obviously, numerous modifications and variations of the present invention are possible in light of the above teachings. It is therefore to be understood that within the scope of the appended claims, the invention may be

What is claimed as new and desired to be secured by Letters Patent of the United States is:

1. A simulator for simulating operation of a vehicle for an operator, comprising:
    a control booth for duplicating controls of the vehicle; and
    a display screen viewable from inside said booth for simulating a view from the vehicle, the display screen including an active screen at least a portion of which is spherical and having a display device which is formed at least partly by juxtaposed cells each constituting an image-forming surface of a device for producing images, the cells being excited individually, cells not excited being dark, wherein the cells comprise sheets of encapsulated liquid crystals.

2. A simulator according to claim 1, wherein each cell comprises a plurality of image elements, means being provided for electronically addressing each image element of each cell.

3. A simulator according to claim 1, wherein the cells function by transmission.

4. A simulator according to claim 1, further including a reflector and wherein the cells function by reflection from said reflector.

5. A simulator according to any one of claims 1-4, wherein colored dots are painted on the cells.

6. A simulator according to claim 1, wherein at least one of said cells has a different size than others of said cells.

7. A simulator according to claim 1, further including a light source common to a first plurality of said cells wherein said cells are reflective and are located inside said spherical part of said simulator and said one light source is slaved to an axis of observation of said operator.

8. A simulator according to claim 1, wherein each of said cells is associated with a projection means with each projection means including a light source.

9. A simulator according to claim 1, further including a projection means and a plurality of optical fibers fed from said projector and being closely packed at said projector to a respective one of said cells wherein ends of said optical fibers at said cell are spread apart and shaped as microlenses.

10. The simulator according to claim 7, wherein said at least one light source is slaved to the operator's head movements.

* * * * *